(12) United States Patent
Despineux et al.

(10) Patent No.: US 12,467,700 B2
(45) Date of Patent: Nov. 11, 2025

(54) WALL ELEMENT FOR THE CONSTRUCTION OF A HOUSING

(71) Applicant: Torqeedo GmbH, Wessling (DE)

(72) Inventors: Frank Despineux, Wessling (DE); Juri Schmidt, Munich (DE); Dieter Wiedersatz, Augsburg (DE)

(73) Assignee: Torqeedo GmbH, Wessling (DE)

( * ) Notice: Subject to any disclaimer, the term of this patent is extended or adjusted under 35 U.S.C. 154(b) by 804 days.

(21) Appl. No.: 17/493,195

(22) Filed: Oct. 4, 2021

(65) Prior Publication Data
US 2022/0107145 A1   Apr. 7, 2022

(30) Foreign Application Priority Data

Oct. 5, 2020 (DE) .................. 10 2020 126 036.9

(51) Int. Cl.
| | |
|---|---|
| F28F 3/14 | (2006.01) |
| F28F 13/06 | (2006.01) |
| F28F 9/00 | (2006.01) |
| F28F 13/00 | (2006.01) |

(52) U.S. Cl.
CPC .............. F28F 3/14 (2013.01); F28F 13/06 (2013.01); *F28F 9/001* (2013.01); *F28F 13/003* (2013.01); *F28F 2013/006* (2013.01)

(58) Field of Classification Search
CPC .... F28F 3/14; F28F 13/06; F28F 9/001; F28F 13/003; F28F 2013/006
See application file for complete search history.

(56) References Cited

U.S. PATENT DOCUMENTS

| 4,982,785 A | * | 1/1991 | Tomlinson | F28F 3/12 |
| | | | | 165/170 |
| 5,517,757 A | * | 5/1996 | Hayashi | B60H 1/3227 |
| | | | | 29/890.039 |
| 6,199,626 B1 | * | 3/2001 | Wu | F28F 3/027 |
| | | | | 165/166 |
| 7,182,125 B2 | * | 2/2007 | Martin | F28D 1/0383 |
| | | | | 165/170 |
| 12,009,495 B2 | * | 6/2024 | Aiello | H01M 50/209 |

(Continued)

FOREIGN PATENT DOCUMENTS

| DE | 10201021811 A1 | 12/2011 |
| DE | 202012102349 U1 | 7/2012 |

(Continued)

OTHER PUBLICATIONS

Extended European Search Report mailed Feb. 16, 2022 in Corresponding European Patent Application No. 21200930.2 (7 pages).

(Continued)

*Primary Examiner* — Raheena R Malik
(74) *Attorney, Agent, or Firm* — Greenberg Traurig, LLP; Roman Fayerberg; Jaime Burke (57) ABSTRACT

The present disclosure relates to a wall element (10) for the construction of a housing to accommodate an energy storage device or to create a cooling plate, comprising a base plate (2) and a flow channel (4) formed in the base plate (2) with a flow cross-section for a cooling medium (6) to flow through, an inlay (8) being disposed in the flow channel (4) in order to reduce the flow cross-section.

21 Claims, 5 Drawing Sheets

(56) References Cited

U.S. PATENT DOCUMENTS

| | | | |
|---|---|---|---|
| 2004/0069474 A1* | 4/2004 | Wu | F28F 3/12 165/185 |
| 2005/0115701 A1* | 6/2005 | Martin | F28F 13/12 165/170 |
| 2006/0291165 A1* | 12/2006 | Flesch | H01L 23/473 257/E23.098 |
| 2012/0082880 A1* | 4/2012 | Koetting | B21D 53/04 29/890.039 |
| 2012/0171543 A1 | 7/2012 | Hirsch et al. | |
| 2013/0014923 A1* | 1/2013 | Girmscheid | H01M 10/6556 165/168 |
| 2014/0020867 A1* | 1/2014 | Moruzzi | F28F 1/40 165/104.19 |
| 2016/0320141 A1* | 11/2016 | Barfknecht | F28F 9/026 |
| 2018/0149433 A1* | 5/2018 | Peskos | F28D 9/0056 |
| 2019/0003787 A1* | 1/2019 | Tanaka | F28F 13/00 |
| 2019/0212067 A1* | 7/2019 | Lan | F28D 9/0068 |
| 2019/0366876 A1 | 12/2019 | Cheadle et al. | |
| 2020/0153062 A1 | 5/2020 | Collins | |
| 2021/0280927 A1* | 9/2021 | Aiello | H01M 10/6556 |
| 2023/0228501 A1* | 7/2023 | Wang | F28F 3/12 165/157 |

FOREIGN PATENT DOCUMENTS

| | | |
|---|---|---|
| DE | 102012107684 A1 | 2/2014 |
| DE | 102013219547 A1 | 4/2014 |
| DE | 112013003579 T5 | 4/2015 |
| DE | 102014001975 A1 | 8/2015 |
| DE | 102016008110 A1 | 2/2017 |
| DE | 102018205568 A1 | 10/2019 |
| DE | 202019101687 U1 | 6/2020 |
| EP | 3070780 B1 | 9/2016 |
| FR | 2697678 A1 | 5/1994 |
| WO | 2016079279 A1 | 5/2016 |
| WO | 2020009997 A1 | 1/2020 |
| WO | 2020033139 A1 | 2/2020 |

OTHER PUBLICATIONS

"Torqeedo Katalog 2009," 2009, 24 pages.
"Operating Manual Ultralight 402," Sep. 15, 2009, 64 pages.
"Torqeedo Katalog 2010," 2010, 24 pages.
"Torqeedo Katalog 2011," 2011, 24 pages.
"Torqeedo Katalog 2012," 2012, 32 pages.
"Torqeedo Katalog 2013," 2013, 21 pages.
"Torqeedo Katalog 2014," 2014, 46 pages.
"Torqeedo 2015," 2015, 64 pages.
"Torqeedo Electric Boating 2016," 2016, 74 pages.
"Operating Manual Ultralight 403," Mar. 22, 2016, 72 pages.
Guldenring, Sabine, "Service Manual Ultralight 403 and 1103," Mar. 23, 2016, 17 pages.
"Torqeedo Electric Boating 2017," 2017, 76 pages.
"Torqeedo Electric Boating 2018," 2018, 76 pages.
"Torqeedo Elektromobilität auf dem Wasser 2019," 2019, 76 pages.
"Ultralight 403 A/AC 1103 AC original operating instructions", Jan. 25, 2019, 131 pages.
Ultralight 403 A (320W) Drawing No. TQ-1405-00, Jan. 30, 2019, 1 page.
Ultralight 1103 AC (915Wh) Drawing No. TQ 1408-00_IND, Aug. 21, 2019, 2 pages.
Ultralight 1103 AC (915Wh) Drawing No. TQ 1408-000, Aug. 21, 2019, 1 page.
"Torqeedo Elektromobilität auf dem Wasser 2020," 2020, 72 pages.
"Addendum to the Ultralight 1103 AC User Manual," Jan. 13, 2020, Version 1.1, 2 pages.

* cited by examiner

WALL ELEMENT FOR THE CONSTRUCTION OF A HOUSING

CROSS REFERENCE TO RELATED APPLICATIONS

This application claims priority to and the benefit of German Patent Application No. DE 10 2020 126 036.9, filed Oct. 5, 2020, the contents of which is incorporated by reference in its entirety.

TECHNICAL FIELD

The present disclosure relates to a wall element for the construction of a housing to accommodate an energy storage device or to create a cooling plate, comprising a base plate and a flow channel formed in the base plate with a flow cross-section for a cooling medium to flow through. The present disclosure further relates to a method of manufacturing such a wall element. In addition, the present disclosure relates to a wall structure comprising a plurality of such wall elements.

BACKGROUND

It is known to provide base plates in wall elements for cooling a variety of applications, which have a flow channel inside them. Examples of such applications include wall elements for the construction of a housing that can be used to accommodate an energy storage device for the construction of a battery, in particular a traction battery. Other examples are cooling plates inside a housing or cooling plates for cooling electronic components. As necessary, a cooling medium can flow through the flow channel inside the base plate to cool the energy storage device. Such base plates are designed to perform both the function of a load-bearing element and the function of a cooling plate. To ensure that they are able to function as load-bearing elements, these base plates may be designed with suitably thick walls. Alternatively, the distances between the individual walls of the base plate can be increased in order to achieve the load-bearing capacity. However, this means that a flow channel provided in the base plate will also have a large cross-section, the result of which may be that a cooling medium that is used will have insufficient flow velocity, or that a high volumetric flow rate is needed in order to achieve a desired flow velocity.

SUMMARY

Based on the known state of the art, the problem underlying the present disclosure is to provide an improved wall element.

The problem is solved by a wall element having the features of the claims, as described the description and shown the figures.

Accordingly, in some embodiments, there is provided a wall element for the construction of a housing to accommodate an energy storage device or to create a cooling plate is proposed, comprising a base plate and a flow channel formed in the base plate which provides a flow cross-section for a cooling medium to flow through. According to the disclosure, an inlay is disposed in the flow channel in order to reduce the flow cross-section and/or deflect the cooling medium.

A wall element within the meaning of the present disclosure can be understood as a component which, in the installed condition, may perform the function of a load-bearing element, in particular the function of a load-bearing wall element of a housing to accommodate an energy storage device or the function of a cooling plate. The wall element is therefore designed to absorb forces acting from outside or to transmit distribution of forces that are significantly greater than forces resulting, for example, from the wall element's own weight. The same applies in the event that the wall element has purely to perform the function of a cooling plate.

The wall element may be a cooling plate within a housing. For example, the wall element may form a bottom of a housing to accommodate an energy storage device. Alternatively, the wall member may be a generic cooling plate which, as a wall element, has sufficient strength for the wall element to act as a structural or load-bearing element.

An energy storage device, which is not part of the present disclosure, may be generally understood to mean a reservoir containing a medium to be cooled that can be thermally coupled to the wall element. The energy storage device may be formed, for example, by one or more battery cells or one or more battery modules, which are to be accommodated in the housing in order to provide, for example, a traction battery for an electric motor.

Unless otherwise indicated, all heat and mass transfer phenomena discussed in the present disclosure relate to the wall element alone, separately from any energy storage device that may be present or from any other adjacent component or volume.

The disposing of the inlay in the flow channel causes a volume displacement in the flow channel, thereby reducing the flow cross-section. Compared to a flow channel without an inlay, this results in a higher flow velocity of the cooling medium for the same volumetric flow rate of the cooling medium.

Furthermore, the disposing of the inlay in the flow channel can produce a deflection of the cooling medium, which likewise results in an at least locally increased flow velocity.

The increased flow velocity generates more turbulence in the cooling medium, which in turn leads to improved heat transfer between the base plate and the cooling medium. This may increase the thermal efficiency of the wall element for cooling an energy storage device.

As a result, due to the presence of the inlay, higher thermal efficiency can be achieved with the same volumetric flow rate. At the same time, the thermal efficiency obtained without the inlay can be achieved at a lower volumetric flow rate if the inlay is disposed in the flow channel.

The increased flow velocity due to the inlay also has the advantage that fewer dead water areas occur in the flow channel, which means that the thermal efficiency of the wall element can be increased and a more homogeneous heat transfer can be achieved.

Thermal efficiency reflects the ratio of thermal energy absorbed to thermal energy released—in other words, the percentage of heat actually transferred between the media concerned.

The present disclosure is illustrated mainly with reference to a wall element that uses a cooling medium to cool an energy storage device. However, this is by way of example and not to be understood restrictively. Instead of a cooling medium, it is also possible to use a heating medium to heat an energy storage device based on the same principles.

A cooling medium can be understood as a fluid that flows through the flow channel in an at least partially liquid aggregate state. This is typically cooling water. For the purposes of the present disclosure, cooling water can be understood to mean, for example, water or another fluid, in particular a so-called refrigerant (for example, R134a), but also a mixture of fluids, for example a mixture containing 50% water and 50% glycol. Thus, cooling water can also be understood as a gaseous medium and/or a medium in different aggregate states. If, for example, a refrigerant (for example, R134a) is used, the cooling water in the wall element according to the present disclosure may be wholly or partially expanded, and thus may be present wholly or partially in a gaseous aggregate state.

For the purposes of the present disclosure, the term dead water area may be generally understood to mean areas of cooling media that do not follow, or only partially follow, the main flow path. For example, this can mean stationary fluid vortices that form in peripheral areas, especially in corners, of the fluid channel. Thus, dead water areas are distinguished from the main flow path by the fact that fluid transport in the direction of the main flow path is slowed down or comes to a complete standstill in these areas. As previously mentioned, the flow velocity of the cooling medium has a direct effect on heat transfer in the wall element. Furthermore, dead water areas can cause pressure to drop because they can create a flow barrier to the main flow path.

Consequently, dead water areas reduce thermal efficiency and the homogeneity of heat transfer, so reducing the occurrence of dead water areas causes these characteristics to improve.

In some embodiments, the inlay has turbulators to generate turbulence in the cooling medium, the turbulators may have projections and/or indentations, and/or the turbulators may have continuous structures, in particular wires, cylinders, bulges, recesses, and/or surface roughness. In some embodiments, the turbulators are formed in one piece with the inlay.

For the purposes of the present disclosure, turbulators can be understood as flow resistors whereby turbulence is generated in the cooling medium, thereby improving heat transfer between the base plate and/or the inlay and the cooling medium. As a result, turbulators can be used to increase the thermal efficiency of the wall element.

For example, turbulators can achieve the critical Reynolds number Ret even at lower volumetric flow rates. Even where the cooling medium has a predominantly laminar flow profile, turbulators can generate local, temporary turbulence fields, which can also increase the thermal efficiency of the wall element. Moreover, thermally insulating border layers of the cooling medium, known as boundary layers, can be broken up. This can improve heat transfer between the cooling medium and the inlay.

Because the turbulators are formed on the inlay, no other individual parts are needed to generate turbulence. Consequently, any turbulator geometries can be realized on the inlay without increasing the manufacturing and assembly costs.

Providing turbulators in the form of projections and/or indentations has the advantage that they can be easily and inexpensively incorporated into the surfaces of the inlay. Using continuous structures, in particular wires, cylinders or the like, as turbulators has the advantage that they can be easily and inexpensively inserted into or along the inlay. On the one hand, the term "continuous" can mean a geometry that is continuous in the flow direction. On the other hand, it can also mean, for example, a passage from the lower to the upper surface of the flow channel. Turbulators in the form of surface roughnesses have the advantage that they can be easily and inexpensively implemented into the surfaces of the inlay and are also easy to calculate theoretically.

In some embodiments, the turbulators are specifically formed such that the pressure drop generated by the turbulators in the cooling medium flowing through the flow channel is less than 10%, or less than 1%, compared to the pressure drop that occurs when cooling medium flows through the flow channel at the same volumetric flow rate without turbulators. Thermal efficiency can thus be increased with only a small increase in pressure drop, thus improving the overall efficiency of the higher-level system.

In some embodiments, the inlay has at least one flow passage element for deflecting the cooling medium. For the purposes of the present disclosure, a flow passage element may be understood as an element that deflects the cooling medium in a new flow direction. This new flow direction can, for example, have a defined flow profile in the new flow direction. The flow passage element may also be provided in the form of a simple opening in the inlay, whereby the cooling medium is enabled to pass from one side of the inlay to another side of the inlay.

Because the flow passage element is formed in the inlay, no other individual parts are needed to deflect the flow. Consequently, any flow passage element geometries can be realized on the inlay without increasing the manufacturing and assembly costs.

Deflection of the flow via flow passage elements has the advantage that cooling medium that is still cold can be directed specifically to the places to be cooled, and cooling medium that has already been heated can be directed to other places as appropriate. In particular, thermal insulation of the base plate from the external environment can be achieved through suitable deflection of the flow.

In an advantageous further development, the cooling medium can be directed or accelerated by suitably disposed flow passage elements specifically to one or more turbulators which then generate local turbulence in the cooling medium, thereby improving the thermal efficiency of the wall element.

In an advantageous further development, the inlay has a flow passage element which is adapted to divide the flow channel into at least two fluidly connected subchannels, such that, when cooling medium flows through the flow channel, the cooling medium flows from the first subchannel into the second subchannel.

In some embodiments, the inlay has a flow passage element which is adapted to produce a deflection of the cooling medium within the at least one subchannel, such that a main flow path of the cooling medium formed upon flowing through is longer than the length of the subchannel concerned. In other words, the flow passage element can be used to separate the volume into two fluidly connected subchannels. This increases the distance that the cooling medium has to travel in the wall element before the cooling medium exits the wall element again.

In this way, cooling medium that is still cold can be specifically directed to places to be cooled, and cooling medium that has already been heated can be directed to other places. In particular, thermal insulation of the base plate from the external environment can also be achieved through suitable deflection of the flow. This can be done, for example, by ensuring that certain areas of the base plate that are to be thermally insulated are not in contact with cooling medium. This can be realized, for example, by means of a cavity formed between the base plate and the cooling medium.

In an advantageous further development, the base plate has two parallel spaced subplates, with the flow channel extending between the subplates. This allows for easy fabrication as well as base plates and inlays that are simply and repeatably dimensioned.

In some embodiments, the base plate further comprises an inlet and an outlet, the inlet and/or the outlet being disposed orthogonally to the surface of the base plate.

Via the inlet and outlet, the base plate can be easily integrated into a circuit of cooling medium. Since the inlet and/or outlet are disposed orthogonally to the surface of the base plate, any connections to the outside can be formed in such a way that the base plate's capacity to serve as a supporting structure is not or only slightly impaired.

In some embodiments, the inlet and/or outlet open into an inlet channel and an outlet channel respectively, the inlet channel and/or outlet channel being at least partially formed by the inlay. This makes it possible to optimize flow guidance within the base plate. In particular, cooling medium that is still cold can be specifically directed to places to be cooled, and cooling medium that has already been heated can be directed to other places. The thermal efficiency of the wall element can thereby be improved.

In some embodiments, the inlay forms cavities in the flow channel through which cooling medium does not flow. Such cavities may extend fully or partially along an inner surface of the base plate. One advantage of such cavities is that these cavities thermally insulate the wall element from the environment. At the same time, such cavities can further reduce volume displacement within the flow channel. All of the above measures, individually or together, can lead to an improvement in the thermal efficiency of the wall element.

In some embodiments, the base plate has an essentially rectangular footprint and fastening means along an outer side. This allows the inlay to be easily introduced into the wall element along the outer sides. The presence of fastening means on at least one outer side allows a plurality of base plates to be connected in modular fashion. This can improve the assembly and maintenance of wall elements.

In some embodiments, the inlay has at least one subdivision that, together with the base plate, forms a separate flow channel. This allows the flow channel provided in the base plate to be further subdivided, thereby achieving a preferential inflow to the base plate.

In some embodiments, the base plate is formed as an extruded part, for example, as an aluminum extruded part. One advantage of the aluminum extrusion process is the significantly better thermal conductivity of aluminum compared to steel, for example, which improves heat transfer in the wall element and may increase thermal efficiency.

In an advantageous further development, the inlay comprises a plastic and may be thermally insulating. This enables simple and cost-effective production and assembly of the inlay, even with complex inlay geometries. Due to the particularly low thermal conductivity of plastics, the inlay can be used as a one-sided insulating element in the wall element. The plastic inlay allows easy assembly, a low parts count and low cost.

On the method side, the problem is further solved by a method of manufacturing a wall element.

A manufacturing method is accordingly proposed, comprising the steps of manufacturing the base plate by an extrusion process, inserting the inlay into the base plate, and closing of remaining openings. This has the advantage that the wall element according to the present disclosure can be manufactured by a manufacturing method that is only slightly modified compared to manufacturing methods used for commercially available wall elements. Established manufacturing methods can thus be easily modified through minor adjustments.

In some embodiments, the remaining openings of the base plate are closed by welding or gluing. Tight and durable sealing of the base plate can easily be achieved in this way.

The problem is further solved by a wall structure comprising a plurality of wall elements according to the present disclosure.

BRIEF DESCRIPTION OF FIGURES

Further embodiments of the disclosure are explained in more detail by the following description of the figures. These show.

DETAILED DESCRIPTION

Certain embodiments are described below on the basis of the figures. Identical, similar or similarly acting elements are given identical reference signs in the various figures, and a repeated description of these elements is in some cases omitted in order to avoid redundancies.

Figure 1:
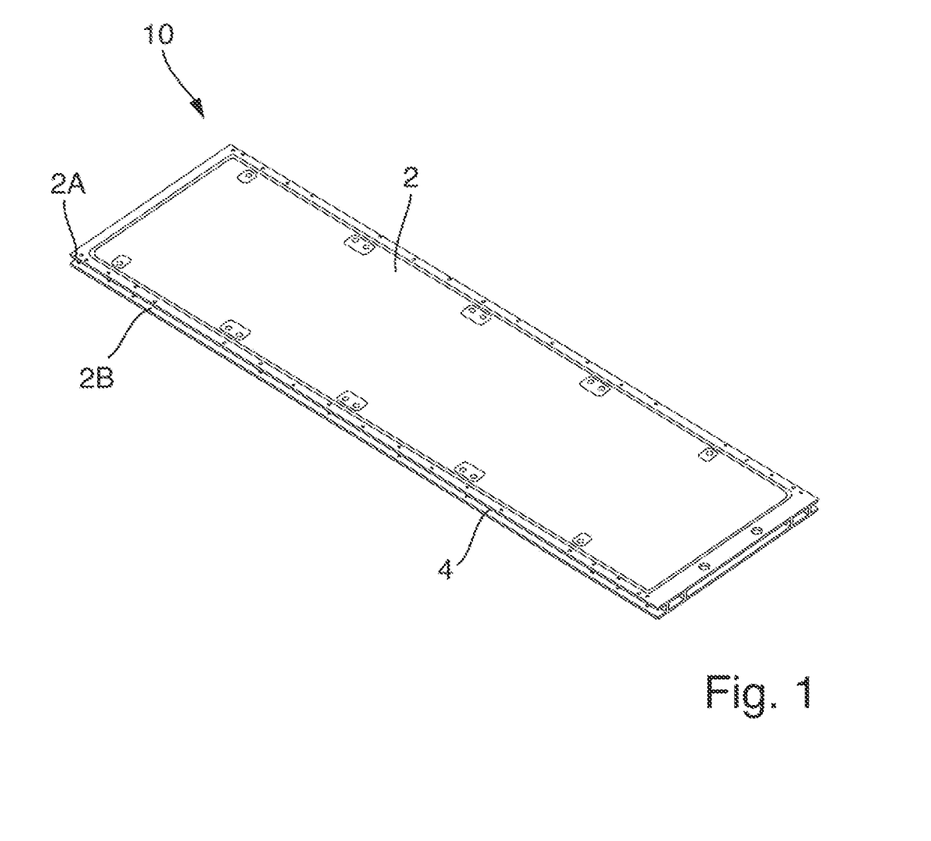
FIG. 1 A wall element according to the state of the art in a perspective view FIG. 2 A side view of a wall element according to a first embodiment FIG. 3 A side view of a wall element according to a further embodiment FIG. 4 A side view of a wall element according to a further embodiment FIG. 5 A side view of a wall element according to a further embodiment FIG. 6 A side view of a wall element according to a further embodiment FIG. 7 A side view of a wall element according to a further embodiment FIG. 8 A side view of a wall element according to a further embodiment FIG. 9 A plan view of an inlay according to a further embodiment and FIG. 10 A plan view of a wall element showing an inlay according to the embodiment shown in FIG. 9 together with the base plate.

FIG. 1 schematically illustrates a wall element 10 for the construction of a housing to accommodate an energy storage device in a perspective view.

The wall element 10 is suitable for cooling an energy storage device, not shown, by means of a cooling medium, not shown. The wall element 10 comprises a base plate 2 and a flow channel 4 formed within the base plate 2 for the cooling medium 6 to flow through. More specifically, the flow channel 4 is formed between a first subplate 2A and a second subplate 2B of the base plate 2.

The base plate 2 can be manufactured by extrusion.

The flow channel 4 within the base plate 2 has a comparatively large flow cross-section due to the manufacturing method. As a result, dead water areas may be formed in the flow channel 4 and, for a given cooling medium flow, the flow velocity is relatively low, thereby reducing the cooling efficiency. This efficiency is to be improved by the embodiments described below.

Figure 2:
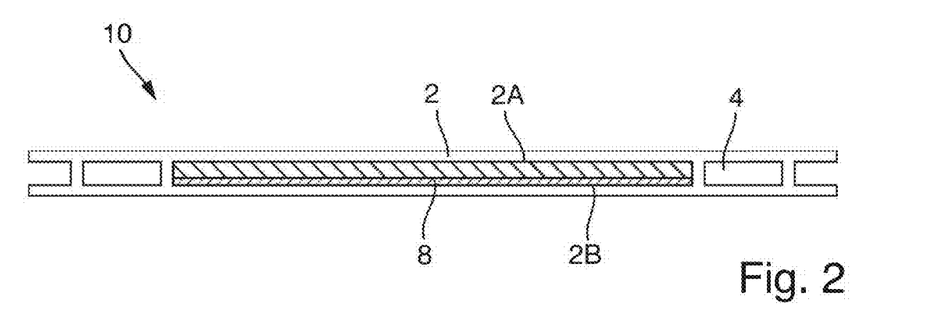

FIG. 2 is a side view of a wall element 10 according to a first embodiment. This shows an end face of the wall element 10.

The wall element 10 is suitable for cooling an energy storage device, not shown, by means of a cooling medium 6 and comprises a base plate 2. A flow channel with a flow cross-section is formed within the base plate 2 for a cooling medium 6 to flow through. In the illustration shown in FIG. 2, the flow channel 4 extends into the plane of the drawing.

An inlay 8 is disposed in the flow channel 4 to reduce the flow cross-section.

The flow cross-section of the flow channel 4 is reduced via the volume displacement by the inlay 8, which is apparent in the cross-sectional view from the reduced height of the flow cross-section. In the illustrated embodiment, the inlay 8 lies against an inner surface of the base plate 2 and the flow channel 4 is formed between the first subplate 2A of the base plate 2 and the inlay 8.

The inlay 8 is inserted into the flow channel 4 of the base plate 2 along the flow channel 4. The volume displacement of the inlay 8 eliminates dead water areas and also reduces the flow cross-section, thus improving the flow of the cooling medium 6 in the flow channel 4 and increasing the flow velocity for a given volumetric flow rate.

The inlay 8 may be formed from a plastic material, for example as an injection-molded or deep-drawn part. The base plate 2 may be formed from a metallic material, for example as an extruded part.

By using a metallic material for the base plate 2, good heat conduction can be achieved between the energy storage device or the components to be cooled disposed on the base plate 2 and the cooling medium 6 carried in the flow channel 4, so that efficient cooling can be achieved.

The inlay 8 formed as a plastic part, on the other hand, may be formed as an insulator. Accordingly, the presence of the inlay 8 thermally insulates the wall member 10 from the outside, that is to say, the subplate 2B is cooled less. This improves cooling performance on the inner side of the base plate 2 and increases thermal efficiency.

In the embodiment shown in FIG. 2, the end faces of the base plate 2 are not yet closed. These openings are closed by positive substance jointing, form fitting or force fitting, for example by means of welding and/or gluing and/or screwing and/or by means of a riveted joint in a process step that follows the insertion of the inlay 8 into the flow channel 4.

Figure 3:
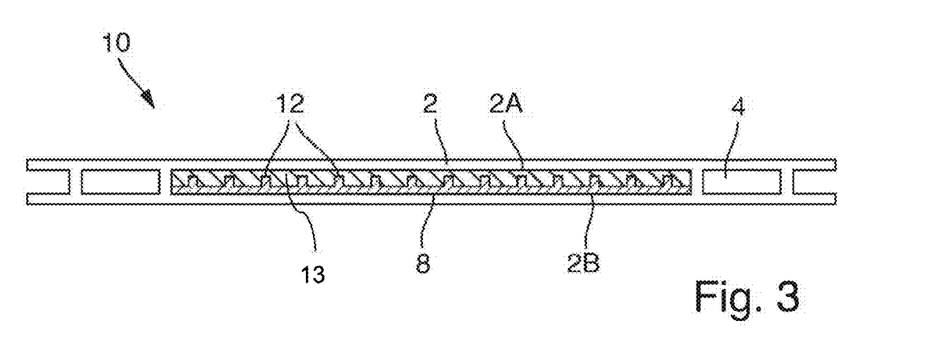

FIG. 3 discloses a side view of a wall element 10 according to a further embodiment. Like the embodiment disclosed in FIG. 2, the wall element 10 of the present embodiment is suitable for cooling an energy storage device, not shown, by means of a cooling medium 6 and comprises a base plate 2. The wall element further comprises a flow channel 4 formed within the base plate 2 for a cooling medium 6 to flow through. An inlay 8 is disposed in the flow channel 4 to reduce the flow cross-section.

The flow cross-section in the flow channel 4 is reduced via the volume displacement of the inlay 8, which is apparent from the reduced height of the flow cross-section. Furthermore, the inlay 8 has turbulators 12 to generate turbulence in the cooling medium 6. In the embodiment shown in FIG. 3, the turbulators 12 have projections that extend part way into the flow channel 4.

The inlay 8 is inserted into the flow channel 4 of the base plate 2. The turbulators 12 are formed in one piece with the inlay 8. Consequently, no further parts may be required. This also means that turbulators 12 can have any geometry. The turbulators 12 influence the flow in the flow channel 4.

The volume displacement of the inlay 8 eliminates dead water areas and improves the flow in the flow channel 4. Moreover, the presence of the inlay 8 thermally insulates the wall member 10 from the outside, that is to say, the subplate 2B is cooled less. This improves cooling performance and increases thermal efficiency. The turbulators 12 can further-more cause the cooling medium to swirl as it flows through the flow channel 4, as a result of which the cooling performance is applied more effectively to the base plate, thus further increasing thermal efficiency.

In the embodiment shown in FIG. 3, the sides of the base plate 2 are not yet closed. These openings are closed by welding and/or gluing in a process step that follows the insertion of the inlay 8 into the flow channel 4.

Figure 4:
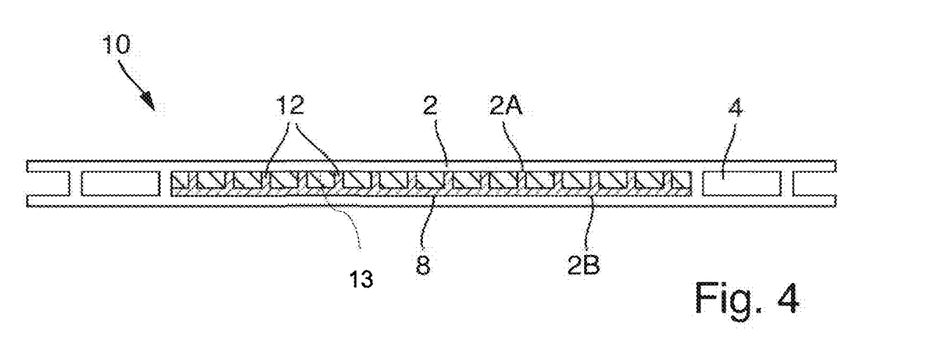

FIG. 4 discloses a side view of a wall element 10, but in a modified embodiment. Like the embodiment disclosed in FIG. 2 and FIG. 3, the wall element 10 of the present embodiment is also suitable for cooling an energy storage device, not shown, by means of a cooling medium 6 and comprises a base plate 2. The wall element 10 according to the embodiment of FIG. 4 likewise comprises a flow channel 4 formed within the base plate 2 for a cooling medium 6 to flow through. An inlay 8 is likewise disposed in the flow channel 4 to reduce the flow cross-section.

The inlay 8 has subdivisions 13 that are directly integrated into the inlay 8 and that divide the remaining space of the flow channel 4 into individual flow channels. The flow channels created in this way can run parallel to each other. Through the dimensioning of the flow channels created in this way, the overall effective flow cross-section can be adjusted and the flow velocity thereby adapted to the respective application.

In other words, the embodiment illustrated in FIG. 4 differs from the embodiment illustrated in FIG. 3 in that the inlay 8 has subdivisions 13 with continuous structures which together extend as far as the opposite subplate 2A. The turbulators 12 of FIG. 3, on the other hand, do not extend continuously to the opposite subplate 2A, but still allow cooling medium to pass through. Furthermore, the turbulators 12 are not necessarily formed continuously along the length of the flow channel 4. The subdivisions 13, on the other hand, when configured to form flow channels, extend along the entire length of the flow channel 4. This allows individual flow channels to be formed, which can be designed in accordance with the desired or required cooling capacity in predefined areas of the wall element 10 and can, for example, have a winding or meandering structure.

Moreover, the presence of the inlay 8 thermally insulates the wall member 10 from the outside, that is to say, the subplate 2B is cooled less. This improves cooling performance and increases thermal efficiency. In the embodiment shown in FIG. 4, the sides of the base plate 2 are not yet closed. These openings are closed by welding and/or gluing in a process step that follows the insertion of the inlay 8 into the flow channel 4.

Alternatively or additionally, in an embodiment not shown, the turbulators 12 or subdivisions 13 may have indentations. However, the turbulators 12 or subdivisions 13 may have other continuous structures, in particular wires, cylinders and/or surface roughnesses.

In particular, the turbulators 12 or subdivisions 13 shown in FIG. 3 and/or FIG. 4 can be specifically designed so that the pressure drop generated in the cooling medium 6 flowing through the flow channel 4 is less than 10%, less than 1%, compared to the pressure drop that occurs when cooling medium 6 flows through the flow channel 4 at the same volumetric flow rate without turbulators 12 or subdivisions 13.

The embodiments disclosed in FIGS. 2, 3 and 4 have in common that the inlay 8 lies against the subplate 2B. However, the inlay 8 can also lie against the opposite subplate 2A. The said embodiments also have in common that the inlay 8 can be inserted laterally between the two subplates 2A and 2B of the base plate 2 of the wall element 10.

Figure 5:
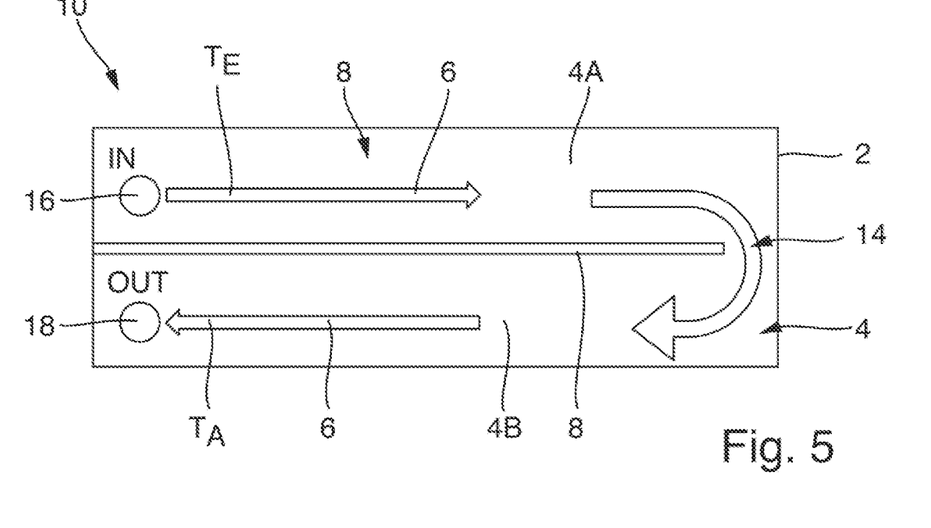

FIG. 5 discloses a side view of a further embodiment of the wall element 10. According to this embodiment, the base plate 2 again has a flow channel 4 extending into the plane of the drawing, in which an inlay 8 is again introduced. In this embodiment, the inlay 8 divides the flow channel 4 into two subchannels 4A and 4B disposed one above the other, which are fluidly connected to each other via a flow passage element 14 in the form of a recess in the inlay 8. In other words, the cooling medium 6 is able to flow from the first subchannel 4A into the second subchannel 4B via the flow passage element 14.

The cooling medium 6 flows into the flow channel 4 of the base plate 2 via an inlet 16 at an inlet temperature $T_E$. The initially cold cooling medium 6 then flows along the inlay 8 through the upper subchannel 4A of the flow channel 4, heating up as a result of heat transfer processes and being deflected at the flow passage element 14 into the lower subchannel 4B. The cooling medium 6 then flows in the lower subchannel 4B, in counterflow to the cooling medium 6 flowing in the upper subchannel 4B, to an outlet 18 and ultimately out of the flow channel 4. The wall element 10 and, in particular, the flow passage element 14 are dimensioned such that the cooling medium 6 achieves a desired flow velocity at a predefined volumetric flow rate in order to enable efficient and homogeneous heat transfer.

At the end of the subchannel 4B, the cooling medium 6 has reached an outlet temperature $T_A$. The inlet 16 and the outlet 18 are designed as separate channels.

If the wall element 10 is used as part of a housing to accommodate an energy storage device, part of the heat transferred by the cooling medium 6 can already be dissipated to the environment on the respective outer side of the housing—for example, on the side where the subchannel 4B is disposed.

With this embodiment, it may be possible to dispense with an external heat exchanger altogether. The heat transfer processes in the interior and to the environment can be optimized in the subchannels 4A and 4B by optimizing the geometry of the cooling channels and ensuring a suitable flow velocity (via a built-in pump). A closed circuit is therefore defined in the cooling plate described.

In a variant of this embodiment, the capillary action of so-called "heat pipes" can also be used to circulate the coolant, so that the pump can also be dispensed with.

In a further variant of this embodiment, circulation of the coolant or refrigerant is effected by evaporation on the inner, hot side and re-condensation on the outer, cold side (known as evaporative cooling). Natural convection of coolant in the heat exchanger can be realized in this way.

The inlay 8 is inserted into the flow channel 4 of the base plate 2. The flow passage elements 14 are directly integrated into the inlay 8. This eliminates the need for additional parts, facilitating assembly due to the small number of parts and keeping costs down. This also means that flow passage elements 14 can have any geometry.

Figure 6:
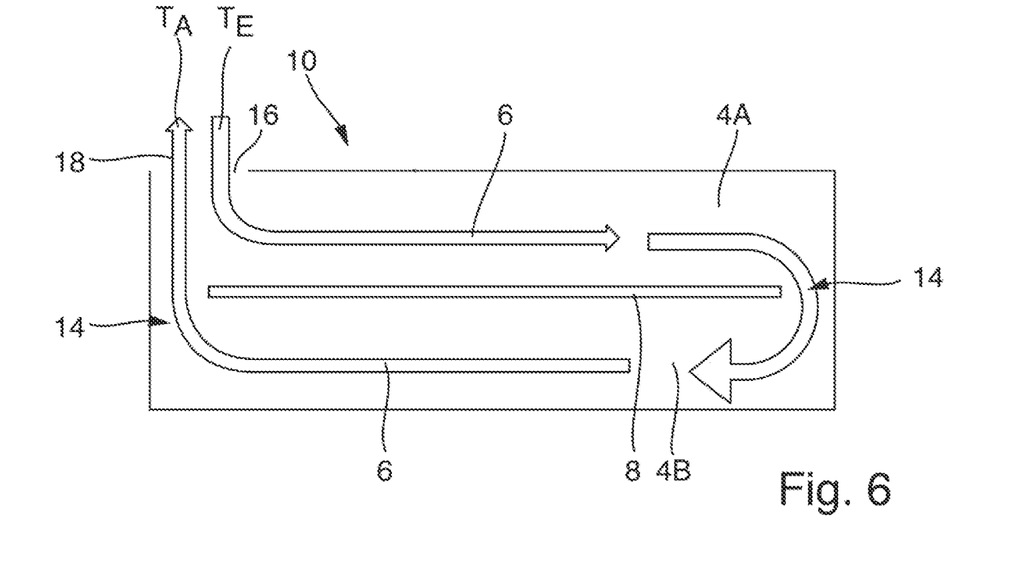

FIG. 6 discloses a further side view of a further embodiment of the wall element 10. According to this embodiment, the base plate 2 has an inlay 8. The inlay 8 has flow passage elements 14 in the form of recesses to deflect the cooling medium 6.

The flow passage elements 14 of the inlay 8 are designed such that the flow channel 4 is divided into two fluidly connected subchannels 4A and 4B, such that, when cooling medium 6 flows through the fluid channel 4, the cooling medium 6 flows from the first subchannel 4A into the second subchannel 4B.

The cooling medium 6 flows into the flow channel 4 of the base plate 2 via an inlet 16 at an inlet temperature $T_E$. The initially cold cooling medium 6 flows further along the inlay 8 through the flow channel 4 and heats up due to heat transfer processes. The flow passage elements 14 are configured such that the cooling medium 6 reaches an outlet temperature $T_A$ at the end of the flow channel 4. At the end of the flow channel 4, the cooling medium 6 is deflected via the flow passage element 14 and flows back in counterflow to the cold cooling medium 6. The flow-back in counterflow takes place in parallel.

The embodiment shown in FIG. 6 differs from the embodiment disclosed in FIG. 5 in that the inlet 16 and the outlet 18 are designed as a common opening disposed on one side of the base plate 2. Consequently, the cooling medium 6 is fed into or discharged laterally from the base plate 2 of the wall element 10.

The inlay 8 is again inserted into the flow channel 4. The flow passage elements 14 are directly integrated into the inlay 8. This eliminates the need for additional parts, facilitating assembly due to the small number of parts and keeping costs down. This also means that flow passage elements 14 can have any geometry. The flow passage elements 14 influence the flow in the flow channel 4.

Figure 7:
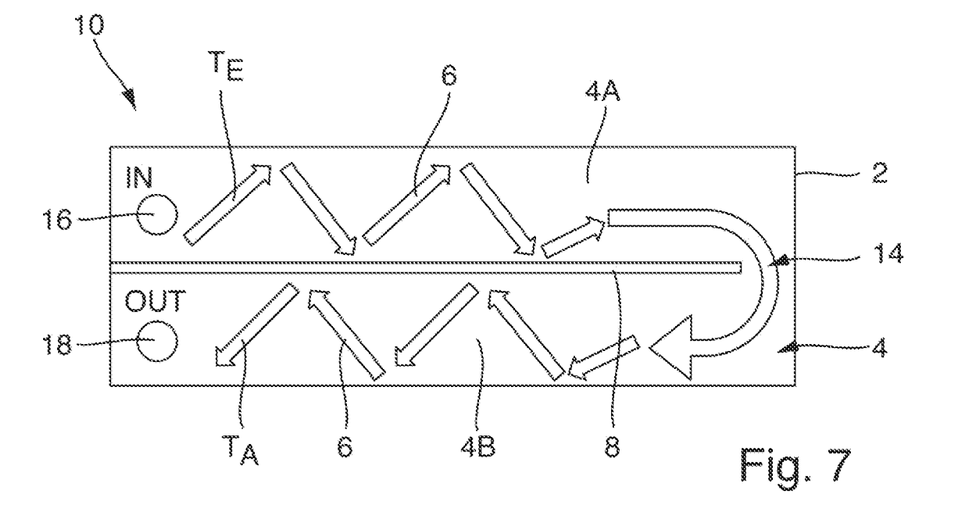

FIG. 7 discloses a side view of a further embodiment of the wall element 10. According to this embodiment, the base plate 2 has an inlay 8. The inlay 8 has a flow passage element 14 to deflect the cooling medium 6.

The cooling medium 6 flows into the flow channel 4 of the base plate 2 via an inlet 16 at an inlet temperature $T_E$. The initially cold cooling medium 6 flows further along the inlay 8 through the flow channel 4 and heats up due to heat transfer processes. At the end of the flow channel 4, the cooling medium 6 is deflected via the flow passage element 14 and flows, in counterflow to the cold cooling medium 6, to and finally out of the outlet 18. The inlet 16 and the outlet 18 are disposed orthogonally to the surface of the base plate 2. The inlet 16 and the outlet 18 are designed as separate channels. The flow passage element 14 is configured such that the cooling medium 6 reaches an outlet temperature $T_A$ at the end of the flow channel 4B.

The embodiment disclosed in FIG. 7 is identical to the embodiment disclosed in FIG. 5, except for the design of the flow passage element 14. In the embodiment discussed here, the flow passage element 14 is configured to create a deflection of the cooling medium 6 in both subchannels 4A and 4B, such that a main flow path (shown as arrows) formed when cooling medium 6 flows through the subchannels is longer than the length of the respective subchannel 4A and 4B.

Figure 8:
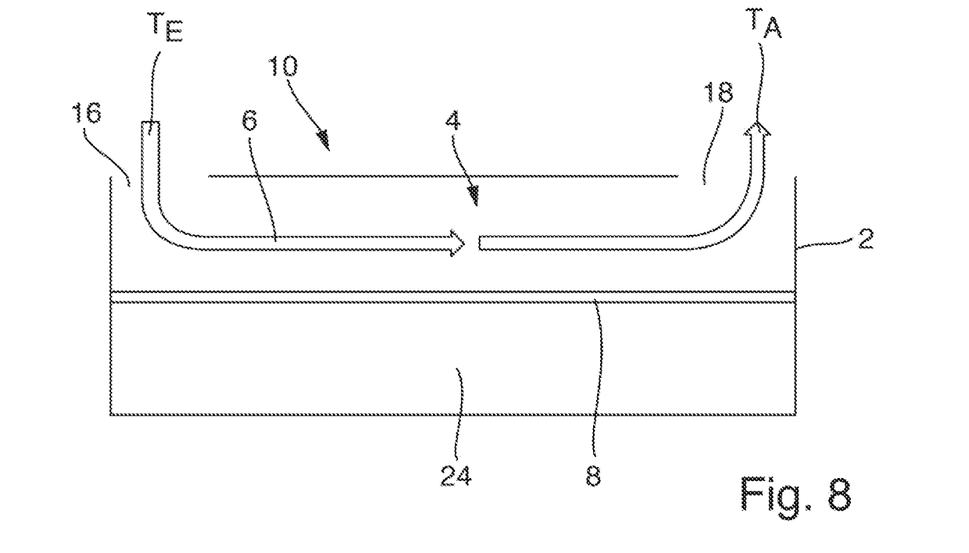

FIG. 8 shows a side view of a wall element 10 according to a further embodiment. According to this embodiment, the base plate 2 has an inlay 8 that divides the base plate 2 into two fluidly separate areas, namely a flow channel 4 and a cavity 24.

The cooling medium 6 flows into the flow channel 4 of the base plate 2 via an inlet 16 at an inlet temperature $T_E$. The initially cold cooling medium 6 flows further along the inlay 8 through the flow channel 4 and heats up due to heat transfer processes. At the end of the flow channel 4, the cooling medium 6 reaches an outlet temperature $T_A$ and is discharged at an outlet temperature $T_A$ from the outlet 18. The inlet 16 and the outlet 16 are configured as separate channels disposed on either side of the base plate 2.

The inlay 8 accordingly reduces the cross-section of the flow channel 4 in the base plate 2, so that a predefined flow velocity of the cooling medium 6 in the flow channel 4 can be achieved at a predefined volumetric flow rate. Furthermore, the base plate 2 can be thermally insulated from the outside by means of the cavity 24.

Figure 9:
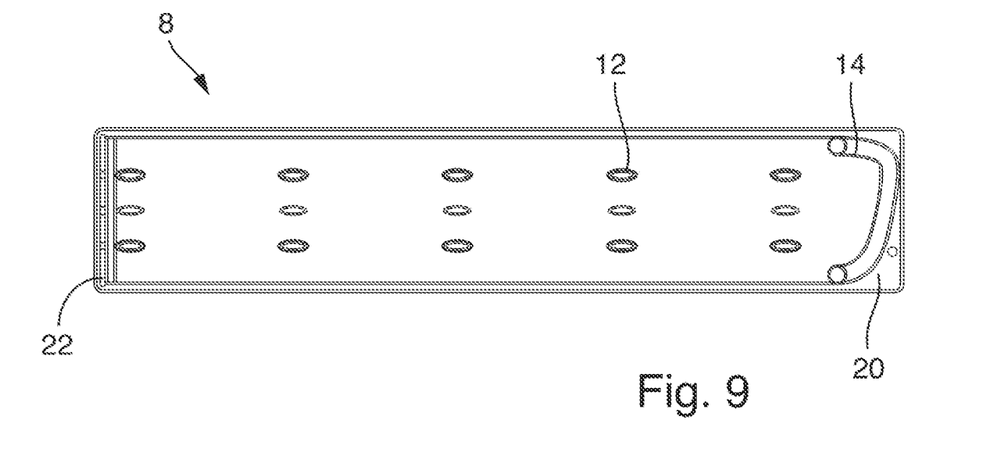

FIG. 9 discloses a plan view of an inlay 8 according to another embodiment of the inlay 8. The inlay 8 has turbulators 12 to generate turbulence in the cooling medium, the turbulators 12 being designed as projections. In this case, the turbulators 12 are formed as, for example, oval projections, whereby the pressure drop generated in the cooling medium when flowing through the flow channel 4 is less than 10%, in particular less than 1%, compared to the pressure drop that would occur when cooling medium flows through the flow channel 4 at the same volumetric flow rate without turbulators. In a further embodiment, not shown, the turbulators are formed as recesses and/or bulges.

The inlay 8 according to the embodiment disclosed in FIG. 9 furthermore has a flow passage element 14 to deflect the cooling medium. This can ensure a pressure-drop-optimized intake of cooling medium.

Furthermore, the inlet 16 and the outlet 18 inside the base plate 2 open into an inlet channel 20 and an outlet channel 22 respectively. In this case, the inlet channel 20 and the outlet channel 22 are partially formed by the inlay 8.

Figure 10:
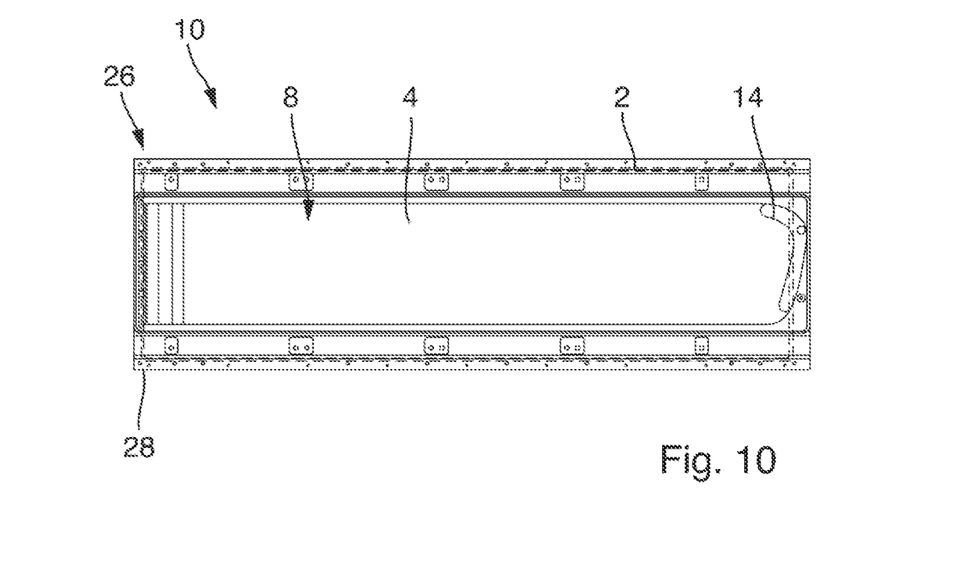

FIG. 10 is a plan view of a wall element 10. FIG. 10 shows an inlay 8 according to the embodiment shown in FIG. 9 together with the base plate 2. The base plate 2 of the wall element 10 has an essentially rectangular footprint. Furthermore, the base plate 2 has fastening means 28 on an outer side 26. The base plate 2 may be manufactured by an extrusion process, in particular by an aluminum extrusion process. The inlay 8 of the wall element 10 may be made of or comprise a plastic.

To manufacture a wall element according to the wall element 10 shown in FIG. 10, in a first step the base plate 2 is manufactured by an extrusion process and in a second step the inlay 8 is inserted into the base plate 2. In a third step, the remaining openings are sealed, in particular by welding and/or gluing.

Insofar as applicable, all of the individual features shown in the embodiments may be combined and/or interchanged without departing from the scope of the disclosure.

LIST OF REFERENCES $T_A$ Outlet temperature
$T_E$ Inlet temperature
2 Base plate
2A, 2B Subplate
4 Flow channel
4A, 4B Subchannel
6 Cooling medium
8 Inlay
10 Wall element
12 Turbulator
13 Subdivision
14 Flow passage element
16 Inlet
18 Outlet
20 Inlet channel
22 Outlet channel
24 Cavity
26 Outside
28 Fastening means

The invention claimed is:

1. A wall element for construction of a housing comprising:
    a base plate comprising one or more subplates;
    a flow channel formed in the base plate with a flow cross-section for a cooling medium to flow through; and
    an inlay disposed in the flow channel in order to reduce the flow cross-section, wherein the inlay comprises turbulators to generate turbulence in the cooling medium, wherein the turbulators are designed in such a way that a pressure drop generated by the turbulators in the cooling medium flowing through the flow channel is less than 10% compared to the pressure drop that occurs when cooling medium flows through the flow channel at the same volumetric flow rate without turbulators,
    wherein the inlay is configured to define the flow channel between the inlay and a subplate of the one or more subplates or to divide the flow channel into multiple subchannels disposed parallel to one another and being fluidly connected to each other via a recess in the inlay forming a flow passage element.

2. The wall element according to claim 1, wherein the turbulators are formed in one piece with the inlay.

3. The wall element according to claim 1, wherein the inlay comprises turbulators to generate turbulence in the cooling medium, the turbulators comprising continuous structures in a form of wires, cylinders or surface roughnesses.

4. The wall element according to claim 1, wherein the inlay comprises at least one flow passage element to deflect the cooling medium.

5. The wall element according to claim 4, wherein the inlay together with the at least one flow passage element subdivides the flow channel into at least a first subchannel and a second subchannel, such that, when cooling medium flows through the flow channel, the cooling medium flows from the first subchannel into the second subchannel.

6. The wall element according to claim 1, wherein the inlay comprises a flow passage element which is adapted to produce a deflection of the cooling medium within at least one subchannel, such that a main flow path of the cooling medium formed upon flowing through is longer than a length of the at least one subchannel concerned.

7. The wall element according to claim 1, wherein the one or more subplates comprises multiple subplates that are parallel to one another and are spaced apart from one another, and the flow channel extends between the multiple subplates.

8. The wall element according to claim 1, wherein the base plate further comprises an inlet and an outlet, the inlet or the outlet being disposed orthogonally to a surface of the base plate.

9. The wall element according to claim 8, wherein the inlet or the outlet inside the base plate open into an inlet channel and an outlet channel respectively, the inlet channel or the outlet channel being formed at least partially by the inlay.

10. The wall element according to claim 1, wherein the inlay forms cavities in the flow channel through which cooling medium does not flow.

11. The wall element according to claim 1, wherein the inlay comprises at least one subdivision which, together with the base plate, forms a separate flow channel in the flow channel.

12. The wall element according to claim 1, wherein the base plate is formed as an extruded part.

13. The wall element according to claim 11, wherein the at least one subdivision is formed in one piece with the inlay.

14. A wall element for construction of a housing comprising:
- a base plate comprising one or more subplates;
- a flow channel formed in the base plate with a flow cross-section for a cooling medium to flow through; and
- an inlay disposed in the flow channel in order to reduce the flow cross-section,
- wherein the inlay comprises a plastic,
- wherein the inlay is configured to define the flow channel between the inlay and a subplate of the one or more subplates.

15. The wall element according to claim 14, wherein the inlay is configured to be thermally insulating.

16. The wall element according to claim 14, wherein the one or more subplates comprises multiple subplates that are parallel to one another and are spaced apart from one another.

17. A wall structure comprising a plurality of wall elements, wherein one or more of the plurality of wall elements comprises: a base plate comprising one or more subplates; and a flow channel formed in the base plate with a flow cross-section for a cooling medium to flow through, wherein an inlay disposed in the flow channel in order to reduce the flow cross-section and wherein the inlay is configured to define the flow channel between the inlay and a subplate of the one or more subplates, wherein the inlay comprises turbulators to generate turbulence in the cooling medium, wherein the turbulators are designed in such a way that a pressure drop generated by the turbulators in the cooling medium flowing through the flow channel is less than 10% compared to the pressure drop that occurs when cooling medium flows through the flow channel at the same volumetric flow rate without turbulators.

18. The wall structure according to claim 16, wherein the turbulators are formed in one piece with the inlay.

19. The wall structure according to claim 17, wherein the one or more subplates comprises multiple subplates that are parallel to one another and are spaced apart from one another.

20. A wall element for construction of a housing comprising:
- a base plate comprising one or more subplates;
- a flow channel formed in the base plate with a flow cross-section for a cooling medium to flow through; and
- an inlay disposed in the flow channel in order to reduce the flow cross-section,
- wherein the inlay comprises turbulators to generate turbulence in the cooling medium,
- wherein the turbulators are designed in such a way that a pressure drop generated by the turbulators in the cooling medium flowing through the flow channel is less than 10% compared to the pressure drop that occurs when cooling medium flows through the flow channel at the same volumetric flow rate without turbulators,
- wherein the inlay is configured to define the flow channel between the inlay and a subplate of the one or more subplates or to divide the flow channel into multiple subchannels disposed parallel to one another and being fluidly connected to each other via a recess in the inlay forming a flow passage element,
- wherein the turbulators extend along an entire length of the flow channel and comprises continuous structures dividing the flow channel into individual flow channels.

21. The wall element according to claim 20, wherein the one or more subplates comprises multiple subplates that are parallel to one another and are spaced apart from one another.

* * * * *